United States Patent [19]

Dorman et al.

[11] Patent Number: 4,596,140
[45] Date of Patent: Jun. 24, 1986

[54] CONSTANT OVERHEAT ANEMOMETER WITH SENSOR LEAD WIRE IMPEDANCE COMPENSATION

[75] Inventors: Frank D. Dorman, Minneapolis; Eric W. Nelson, St. Paul, both of Minn.

[73] Assignee: TSI Incorporated, St. Paul, Minn.

[21] Appl. No.: 652,717

[22] Filed: Sep. 21, 1984

[51] Int. Cl.⁴ ............................................. G01F 1/68
[52] U.S. Cl. ...................................................... 73/204
[58] Field of Search ......................................... 73/204

[56] References Cited

U.S. PATENT DOCUMENTS

| | | |
|---|---|---|
| 3,429,178 | 2/1969 | Durbin .............................. 73/204 X |
| 3,595,079 | 11/1967 | Grahn . |
| 3,597,676 | 8/1971 | Moore .............................. 73/204 X |
| 3,603,147 | 11/1969 | Dorman . |
| 3,800,592 | 4/1974 | Jones, Jr. ........................ 73/204 X |
| 3,928,800 | 6/1973 | Strenglein . |
| 4,024,761 | 5/1977 | Djorup . |
| 4,159,638 | 7/1979 | Potter . |
| 4,297,881 | 11/1981 | Sasayama et al. ................... 73/204 |
| 4,373,387 | 2/1983 | Nishimura et al. .................. 73/204 |
| 4,400,974 | 8/1983 | Nishimura et al. ............... 73/204 X |

FOREIGN PATENT DOCUMENTS

| | | |
|---|---|---|
| 23970 | 2/1981 | European Pat. Off. . |
| 78427 | 5/1983 | European Pat. Off. . |
| 2034482 | 2/1983 | United Kingdom . |

OTHER PUBLICATIONS

Engine Control System Using a Hot-Wire Air Flow Sensor Sasayama, Hitachi Review, vol. 31 (1982).
TSI Technical Bulletin TB5-Hot Film & Hot Wire Anemometry.
TSI Booklet-Hot Wire-Hot Film Anemometer Systems.

*Primary Examiner*—Herbert Goldstein
*Attorney, Agent, or Firm*—Burd, Bartz & Gutenkauf

[57] ABSTRACT

An improved bridge-type hot-wire constant overheat anemometer having current controlled temperature compensation circuitry, whereby matched sensors may be employed. Independent voltage sensing and current supply paths along with high impedance cross-coupled velocity sensing circuitry assures device accuracy.

18 Claims, 5 Drawing Figures

CONSTANT OVERHEAT ANEMOMETER WITH SENSOR LEAD WIRE IMPEDANCE COMPENSATION

FIELD OF THE INVENTION

The present invention relates to hot-wire anemometry and, in particular, to a balanced resistive bridge-type constant overheat anemometer wherein the voltage sensing function is separated from the current supply function whereby a sensor independent current ratio can be established permitting the use of matched sensors and improving the device accuracy.

BACKGROUND OF THE INVENTION

Hot-wire anemometry provides a technique whereby a variety of conditions related to the heat absorptive characteristics of a surrounding medium may be studied and interpolated through the monitoring of electrical power supplied to one or more resistive sensors that are placed in the medium under study. Such sensors typically include temperature sensitive hot-wire, hot-film or thermistor elements with known temperature/resistance characteristics which are exposed to the medium and which are used to track and sense the rate of heat transfer by the medium. In combination therewith, balanced resistive bridge circuitry is commonly applied for maintaining a balanced relative condition between the sensors such that, upon detecting a temperature difference therebetween, reflected in a change of resistance and voltage, power is applied to at least one of the sensors to re-establish equilibrium. The application of the power may then be monitored and used in the determination of a parameter of interest. Examples of devices of this type can be seen upon directing attention to U.S. Pat. Nos. 3,603,147, and 4,159,638 and an article by Sasayama et al, entitled "Engine Control System Using a Hot-Wire Airflow Sensor", *Hitachi Review*, 31:61-66 (1982).

While various control techniques can be employed relative to the resistive sensors, the present invention controls sensor temperature by forcing a certain known resistance. Upon placing the sensor within a flowing medium, changes in flow velocity thus induce unique monitorable changes in the convective power dissipation from the sensor. Such power changes are related to the current supplied in accordance with the following equations:

$$Q = I_{sensor} R_{sensor}$$

$$Q \alpha (A + B \sqrt{V}) DT$$

$$I^2_{sensor} R_{sensor} = (A + B \sqrt{V}) DT$$

where the variable of interest V is the velocity of the medium and $\Delta T$ is the temperature of the sensor above the fluid medium.

Because changes in the fluid medium's ambient temperature can affect the sensed output, it is necessary to monitor the changing temperature in the fluid medium and make corresponding changes in the temperature of the temperature compensating sensor in order to maintain a constant overheat condition ($\Delta T$) or relation between the sensed fluid temperature and the velocity detecting sensor. Upon eliminating the effects of changing fluid temperature, velocity is the only variable and which as mentioned is determined by measuring the power delivered to the velocity sensor. This constant overheat condition is achieved for bridge-type anemometers by referencing the temperature of a velocity determining sensor to a set value (determined by a series coupled resistance) above the temperature of a temperature compensating sensor that tracks the fluid temperature. This type of anemometer is particularly known as a constant overheat anemometer and when implemented in a Wheatstone type bridge anemometer, a balanced condition is maintained between a velocity sensing portion and a temperature sensing portion.

While such constant overheat anemometers have proved extremely useful in a variety of applications, a problem which affects device accuracy is that the conductors over which comparative balanced conditions are sensed are the same conductors as over which the current is supplied for changing the sensor temperature and thus resistance and voltage. Because, too, the power dissipation in the velocity sensor portion is greater than that in the temperature compensation sensor portion, a disparity occurs in the resistances of the individual sensor containing conductor paths which is reflected back in erroneous power consumption data and consequently flow data.

Accordingly, it is a primary object of the present invention to overcome the foregoing problem through the use of control circuitry wherein the voltage sensing conductors are isolated from the current supply conductors. In this regard, too, the fluid temperature sensing function is made to be no longer dependent upon the absolute resistance of the temperature compensation sensor, but instead, now depends upon a current ratio between the temperature compensation leg relative to the velocity sensor leg.

Also provided in the present invention is cross-coupling circuitry in the velocity sensing portion for rejecting any common mode signals present therein. The change in resistance of the lead wire is thus rejected. A further benefit from the combination of the above features in the present circuitry is the ability to employ matched sensors. It is no longer necessary to calibrate the otherwise unmatched sensors relative to one another, since accurate results can now be achieved directly.

The foregoing objects, advantages and distinctions of the present invention over the prior art as well as the construction thereof will, however, become more apparent upon directing attention to the following description with respect to the appended drawings. Before referring thereto, though, it is to be recognized that the description is made with respect to the presently preferred embodiments only and that various modifications may be made thereto without departing from the basic invention.

SUMMARY OF THE INVENTION

The present invention comprises improved bridge-type constant overheat anemometer having independent current control and common mode rejection circuitry. In combination, the control circuitry permits the use of matched temperature compensation and velocity sensors and minimizes errors in device accuracy due to conductor resistance. In the later regard, the voltage sensing conductors are now separate from the current supplying conductors so as to minimize the effects of changes in conductor impedance.

In operation, the temperature compensating portion of the circuitry tracks the fluid temperature and in doing so monitors a pair of voltages relating the velocity sensor to the temperature compensating sensor at a first amplifier and maintains a balanced overheat condition therebetween, controlled by relative current levels only, independent of the resistance of the temperature compensating sensor. The velocity sensing portion, in turn, maintains the balanced condition and predetermined temperature separation established by the temperature compensating sensor via a second amplifier and a cross-coupled high impedance resistive network that is coupled in parallel to the sensors so as to reject the common mode signals present from the lead wire impedance. Depending upon the condition at the second amplifier and the fluid flow past the velocity sensor, power is controlled to supply current to the velocity sensor to cause it to track the temperature established by the temperature compensating sensor. Together, the improved portions of the circuitry improve device accuracy.

DESCRIPTION OF THE PREFERRED EMBODIMENTS

Figure 1:
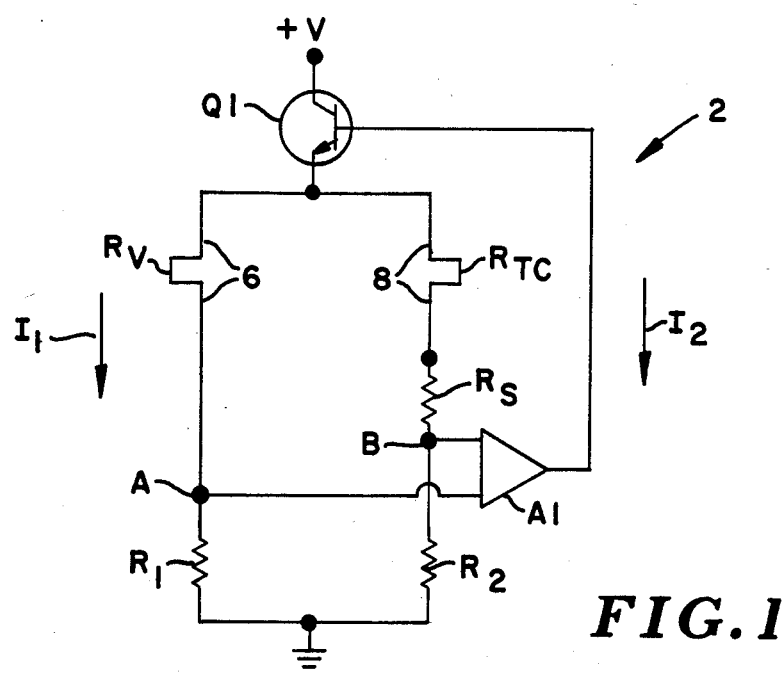
FIG. 1 shows a prior art bridge-type constant overheat anemometer.

Referring to FIG. 1, a schematic diagram is shown of the circuitry employed in a prior art bridge-type constant overheat anemometer 2. As typically configured, the control circuitry employs a pair of thermistor sensors $R_V$ and $R_{TC}$. Depending upon the application, these sensors may take many forms and shapes, but in operation each is caused to be suitably exposed to a flowing medium. The sensor $R_{TC}$ is used to track the ambient temperature of the medium flowing past the sensors and the sensor $R_V$ is used to sense and adjust to the velocity of the medium. The fluid flow velocity is particularly determined by sensing the heat transfer rate, as reflected by the amount of power supplied to the velocity sensing portion and sensor $R_V$ as it strives to maintain a balanced condition relative to the temperature established by the temperature compensation sensor $R_{TC}$.

In performing the above functions, the anemometer 2 is functionally configured in two havles, i.e., a velocity sensing portion and a temperature compensating portion. Depending upon the medium temperature, the temperature compensation circuitry develops a related voltage level at the B-junction to the amplifier A1. The velocity sensing portion, in turn, operates to maintain an equal voltage at the A-junction. Because, too, the fluid temperature is relatively constant, the voltage at the B-junction does not change as much as that at the A-junction, and this voltage is related to the flow velocity effects on the sensor $R_V$. In any case, though, and during operation, the amplifier A1 upon sensing an unbalanced condition between the A and B junctions produces an appropriate output to bias the switching transistor Q1 to conduct and supply current in relation to the temperature related resistive condition of sensors $R_V$ and $R_{TC}$. Because the temperature at the velocity sensor $R_V$ varies the most, and consequently its resistance and the voltage at the A-junction, the current is principally supplied to the velocity sensor $R_V$ to induce a temperature and resistance rise in the $R_V$ sensor that raises the voltage at the A-junction until a balanced condition of $V_A = V_B$ is again sensed. By monitoring the power consumed to maintain $V_A$ and knowing the power consumed by the circuitry in tracking the medium temperature, it is thus possible to determine the flow velocity.

The circuitry of FIG. 1 is also selected relative to the balanced identity of $V_A = V_B$ and which can be represented via the ratios between the resistances in the two portions as per the equation below:

$$\frac{R_V}{R_1} = \left( \frac{R_{TC} + R_{series}}{R_2} \right)$$

From this identity, the resistance value for the resistor $R_1$ is selected to establish the desired voltage range for the output. The resistance $R_{series}$ coupled in series with the temperature compensation resistor $R_{TC}$ is selected to provide a desired alpha coefficient ($\alpha$) and constant overheat condition for the temperature compensation portion. Resistor $R_2$ is selected to establish a desired ratio $(R_{TC} + R_{Series})/R_2$ and thereby control the ratio $R_V/R_1$ and the temperature of the sensor $R_V$.

From the above, it is to be noted that accurate temperature compensation requires that the power consumed in the temperature compensation sensor $R_{TC}$ be much less than in the velocity sensor $R_V$. Accordingly, in the past, sensors of different sizes were employed and commonly required a calibration of the circuitry. In addition, because the voltages sensed at the A and B junctions are sensed via the same conductors 6 and 8 that are employed in supplying the currents $I_1$ and $I_2$ to the sensors, conductor impedance has affected device accuracy. Specifically, the different levels of current flowing in the conductors 6 and 8 produce unequal changes in the resistance of the individual conductors that are not accounted for in the balanced sensor voltages at the A and B junctions. Because this resistance differential can be critical relative to the measurements taken with anemometer 2 and because of the need for mismatched sensors, the circuitry of the present invention was developed.

Figure 2:
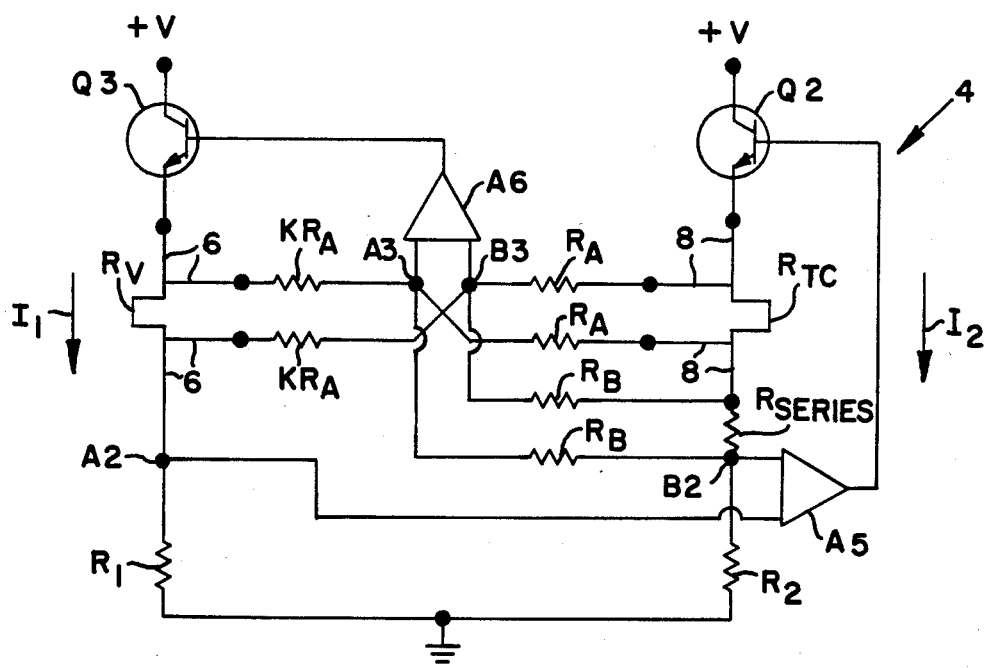
FIG. 2 shows an improved bridge-type constant overheat anemometer having independent current control and common mode rejection circuitry.

With attention therefore directed to FIG. 2, the improved anemometer 4 was developed, among other things, to permit the use of matched sensors $R_V$ and $R_{TC}$ and to overcome the deleterious effects of variations in lead resistance with varying current flow. Like the circuitry of FIG. 1, the circuitry of FIG. 2 is configured to provide a velocity sensing portion and a temperature sensing portion. Now, however, the circuitry is configured about a pair of independent amplifiers A5 and A6 and which appropriately control the transistors Q2 and Q3 to supply the required currents $I_2$ and $I_1$ to the sensors $R_{TC}$ and $R_V$. The power supplies and the conductors 6 and 8 over which the currents are supplied and the voltages sensed are thus separated from each other and no longer affect the other to the extent previously encountered.

Figure 3:
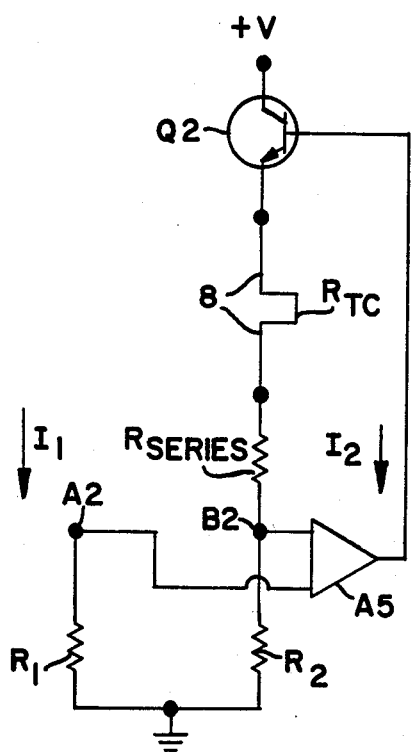
FIG. 3 shows a break-away schematic diagram of the temperature compensation portion of the circuitry of FIG. 2.

Directing attention now to FIG. 3, a partial schematic diagram is shown of the temperature compensation portion of the anemometer 4 wherein transistor Q2 is isolated from the velocity sensor $R_V$ such that upon detecting a change in the medium temperature and an unbalanced condition between the B2 and A2 junctions, the transistor Q2 supplies the current $I_2$ only to the temperature compensation sensor $R_{TC}$ and not the velocity sensor $R_V$. Also, because the voltage at the junctions A2 and B2 are equal, then $I_1 R_1 = I_2 R_2$. This equation can be rewritten as follows:

$$\frac{I_1}{I_2} = \frac{R_2}{R_2}$$

From this equation, it can then be seen that the temperature compensation current $I_2$ is no longer dependent upon the absolute impedance of the temperature compensation sensor $R_{TC}$ but rather now depends only on the ratio of $R_2$ to $R_1$ and the current $I_1$ in the velocity sensor portion of the bridge. Stated differently, the level of temperature compensation is now dependent only on the independently controllable current ratio. This ratio can be determined independently of the sensors. In view of this independence, matched sensors $R_V$ and $R_{TC}$ may now be used.

Figure 4:
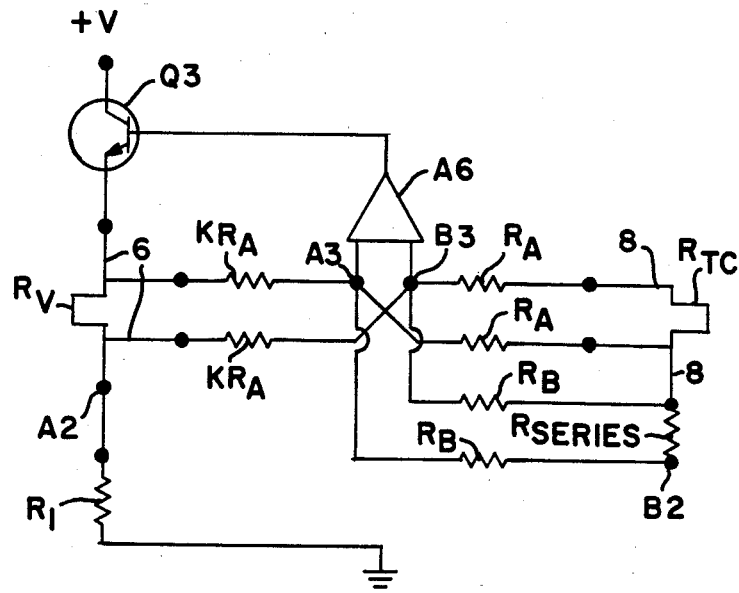
FIG. 4 shows a break-away schematic diagram of the velocity sensing portion of the circuitry of FIG. 2.

Directing attention next to the velocity sensing portion of the circuitry of FIG. 2, this circuitry is shown in FIG. 4 and acts, as before, to maintain the voltage at the junction A2 equal to that at the B2 junction. In supplying the current $I_1$ to the velocity sensor $R_V$, however, an amplifier A6 is now used to drive a transistor Q3 relative to the detection of an unbalanced condition with respect to each of the primary resistive components $R_V$, $R_{TC}$ and $R_{series}$. In particular, a cross-coupled resistive network of resistors $R_A$, $R_B$ and $KR_A$ is employed and which are parallel coupled to opposite sides of each of these resistive elements. In the balanced condition, the voltages at the junctions A3 and B3 are normally maintained in a balanced state and only in the event of a sensed inequality in the voltages across the sensors $R_V$ and $R_{TC}$ does the amplifier A6 cause the switching transistor Q3 to produce the current $I_1$.

Upon a further analysis of the circuit, it is to be noted that the voltage across the velocity sensor $R_V$ is related to the voltage across the temperature compensation sensor $R_{TC}$ and the series resistance $R_{series}$ via the following equation:

$$V_V = K(V_{TC} + V_{series})$$

Multiplying this equation by unity or the left hand side by $I_1/I_1$ and the right hand side by $I_2/I_2$, and substituting: $R_V$ for $$\left(\frac{V_V}{I_1}\right), R_{TC} \text{ for } \left(\frac{V_{TC}}{I_2}\right) \text{ and } R_{series} \text{ for } \frac{V_{series}}{I_2},$$

It can be seen that the resistive elements of the circuit, and in particular, the sensor containing portions are related to one another in the following fashion:

$$R_V = K \frac{R_1}{R_2} (R_{TC} + R_{series})$$

From this equation, it can be seen that the magnitude of the sensed velocity signal is determined by the size of the resistor $R_1$; that the resistance, and correspondingly the temperature, of the velocity sensor $R_V$ is further related to the value of the temperature compensation sensor $R_{TC}$ by the value selected for the K factor; and that the value of $R_{series}$ with respect to $R_{TC}$ determines the alpha coefficient and controls the change in overheat with respect to temperature and thus the temperature compensation effect.

Because the conductors over which the voltage is sensed are separate from the $I_1$ and $I_2$ current carrying conductors and because of the high input impedance presented by $R_A$ and $KR_A$ to the amplifiers A5 and A6 ($R_A$ typically = 5 K ohm), any change in the impedance of the conductors 6 and 8 is reduced by the ratio of $R_{lead}/R_A$. Also, the high input impedance to the amplifiers A5 and A6 minimizes the power consumed by the control circuitry's sampling. The amplifiers A5 and A6 have a high gain so that the output signal is not significantly affected. In passing, it is also to be noted that because of the cross-coupled nature of the resistive network of $R_A$ and $R_B$, any common mode signals present at the junctions A3 and B3 are rejected.

Figure 5:
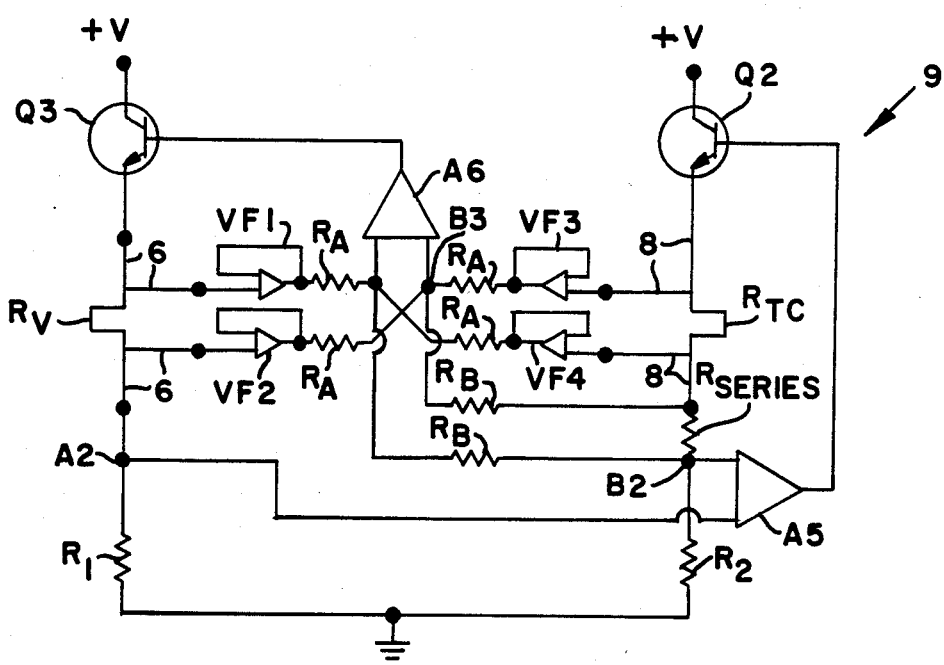
FIG. 5 shows an alternative embodiment of the circuitry of FIG. 2 using voltage followers.

Directing attention now to FIG. 5, an alternative embodiment of the circuitry of FIG. 2 is shown, indicated generally at 9, wherein a number of voltage followers VF1 to VF4 have been coupled in series with the individual resistive elements $R_A$ and $K R_A$ relative to the sensors $R_V$ and $R_{TC}$. Each of the voltage followers VF1 to VF4 exhibits unity gain and a relatively high input impedance and, thus, better matches the input impedance to the amplifer A5.

In summary, the present invention provides an improved bridge-type constant overheat anemometer that permits the use of a pair of matched temperature compensation and velocity sensors. The anemometer also separates the sensing circuitry from the current supply circuitry and minimizes the deleterious effects of varying conductor impedance. The cancellation of lead resistance allows the use of long leads, short low resistance sensors, and more resistive lead connections. The drift in anemometer output due to heating and cooling of leads is eliminated. Lead resistance does not change the resistance or temperature coefficient of resistance of the sensors.

While described with respect to its presently preferred embodiments, it is to be recognized that various modifications may be made to these embodiments by those of skill in the art without departing from the spirit and scope of the invention. Accordingly, it is contemplated that the following claims shall be interpreted broadly to include those equivalent embodiments that fairly fall within the spirit and scope of the present invention.

We claim:
1. An anemometer circuit for sensing a parameter of a flowing medium, comprising in combination:
first and second temperature sensitive resistive elements exposed to a flowing medium, said first resistive element mounted to sense a parameter of said flowing medium and said second resistive element mounted to sense the temperature of said medium;
first comparator means coupled to said first and second resistive elements for comparing first and second signals corresponding to the condition of said respective first and second resistive elements;
means coupled to said comparator means for supplying current to said second resistive element in rela- tion to the temperature of said medium so as to cause said condition of said second resistive element to follow the temperature of said fluid in a predetermined relation thereto;

second comparator means coupled to said first and second resistive elements for detecting a change in a condition of one or the other of the resistive elements, said second comparator means includes first and second inputs, said first and second resistive elements being each coupled in parallel across said first and second inputs for sensing a relative change therebetween; and means coupled to said second comparator means for variably supplying power to said first resistive element to maintain a balanced relation to said second resistive element at said first and second comparator means whereby the power delivered to said first resistive element is determinative of the parameter of interest.

2. Apparatus as set forth in claim 1 including: a third resistive element coupled to said second resistive element, said third resistive element determining a constant predetermined temperature separation between the relative conditions of said first and second elements.

3. Apparatus as set forth in claim 1 wherein: the condition of said second resistive element is proportional to a ratio of a current supplied to said first resistive element relative to a current supplied to said second resistive element.

4. Apparatus as set forth in claim 1 wherein: said first and second resistive elements exhibit substantially similar characteristics of resistivity with respect to temperature.

5. Apparatus as set forth in claim 1 including: first relatively high impedance means connected between opposite ends of the first resistive element and said first and second inputs of said second comparator means, respectively, and second relatively high impedance means connected between opposite ends of the second resistive element and said first and second inputs of said second comparator means, respectively, whereby the effect of any change in the second comparator input impedance on said sensed parameter is minimized.

6. Apparatus as set forth in claim 1 wherein: the parallel coupled first resistive element includes a first relatively high impedance element between the first resistive element and the inputs to the second comparator and the second parallel coupled resistive element includes a second relatively high impedance element between the second resistive element and inputs to the second comparator, whereby the effect of any change in a conductor impedance on said sensed parameter is minimized.

7. An anemometer circuit for sensing a parameter of a flowing medium, comprising in combination:

first and second temperature sensitive resistive elements exposed to a flowing medium, said first resistive element mounted to sense a parameter of said flowing medium and said second resistive element mounted to sense the temperature of said medium;

a third resistive element coupled to said second resistive element, said third resistive element determining a constant predetermined temperature deviation between the otherwise constant temperature separation conditions of said first and second elements;

first comparator means coupled to said first and second resistive elements for comparing first and second signals corresponding to the condition of said respective first and second resistive elements;

means coupled to said comparator means for supplying current to said second resistive element in relation to the temperature of said medium so as to cause said condition of said second resistive element to follow the temperature of said fluid medium in a predetermined relation thereto;

second comparator means coupled to said first and second resistive elements for detecting a change in a condition of one or the other of the first and second resistive elements; said second comparator means includes first and second inputs and said first, second and third resistive elements are each coupled in parallel across said first and second inputs for sensing a relative change therebetween and, means coupled to said second comparator means for variably supplying power to said first resistive element to maintain a balanced relation to said second resistive element at said first and second comparator means whereby the power delivered to said first resistive element is determinative of the parameter of interest.

8. Apparatus as set forth in claim 7 wherein: the condition of second resistive element is proportional to a ratio of current supply to said first resistive element relative to a current supply to said second resistive element.

9. Apparatus as set forth in claim 7 wherein: said first and second resistive elements exhibit substantially similar characteristics of resistivity with respect to temperature.

10. Apparatus as set forth in claim 7 including: first relatively high impedance means connected between opposite ends of the first resistive element and said first and second inputs of said second comparator means, respectively, and second relatively high impedance means connected between opposite ends of the second resistive element and said first and second inputs of said comparator means, respectively, whereby the effect of any change in the second comparator input impedance on said sensed parameter is minimized.

11. Apparatus of claim 7 including: relatively high impedance means connected between the first and second resistive means and said first and second inputs of said second comparator means, respectively, whereby the effect of any change in the second comparator input impedance on said sensed parameter is minimized.

12. A constant overheat anemometer comprising in combination:

a first temperature sensitive resistance element mounted in a flowing medium for sensing the ambient temperature thereof;

first means coupled to said first resistance element and a second temperature sensitive resistance element, said second resistance element having operating characteristics substantially the same as said first resistive element and being mounted in said flowing medium for sensing a flow dependent parameter of said medium, for comparing the ambient temperature of said medium to the temperature at said second resistance element;

first control means responsive to an imbalance detected by said first means for causing the resistance of said first resistance element to follow the temperature of said medium;

second means including a plurality of predetermined relatively large impedance elements coupled to each of said first and second resistance elements and each of the combinations of said first and second resistance elements and impedance elements being coupled in parallel with a pair of inputs to said second means for detecting any imbalance between said second resistance element relative to said first resistance element; and second control means responsive to an imbalance detected by said second means for applying power to said second resistance element to maintain a balanced relation therebetween, the delivered power being determinative of the parameter of interest.

13. An anemometer circuit for sensing a parameter of a flowing medium, comprising in combination: first temperature sensitive resistive means exposed to a flowing medium to sense a parameter of said flowing medium, second temperature sensitive resistive means exposed to said flowing medium to sense the temperature of said flowing medium, first comparator means coupled to said first and second resistive means for comparing first and second signals corresponding to the condition of said respective first and second resistive means, means coupled to said comparator means for supplying current to said second resistive means in relation to the temperature of said medium so as to cause said condition of said second resistive means to follow the temperature of said medium in a predetermined relation thereto, second comparator means coupled to said first and second resistive means for detecting a change in a condition of one or the other of the resistive means, relatively high impedance means connected between the first and second resistive means and said second comparator means, respectively, whereby the effect of any change in the second comparator means impedance on said sensed parameter is minimized, and means coupled to said second comparator means for variably supplying power to said first resistive means to maintain a balanced relation to said second resistive means at said first and second comparator means whereby the power delivered to said first resistance means is determinative of the parameter of interest.

14. Apparatus as set forth in claim 13 wherein: said relatively high impedance means comprises a first relatively high impedance element connected between one input of said second comparator means and the first resistive means and a second relatively high impedance element connected between a second input of said second comparator means and the second resistive means whereby the effect of any change in the second comparator input impedance on said sensed parameter is minimized.

15. Apparatus as set forth in claim 13 including: a third resistive means coupled to said second resistive means, said third resistive means determining a constant predetermined temperature deviation between the otherwise constant temperature separation conditions of said first and second resistive means.

16. The apparatus as set forth in claim 15 wherein: said second comparator means includes first and second inputs and said first, second and third resistive means are each coupled in parallel across said first and second inputs for sensing a relative change therebetween.

17. Apparatus as set forth in claim 13 wherein: the condition of said second resistive means is proportional to a ratio of a current supply to said first resistive means relative to a current supply to said second resistive means.

18. Apparatus as set forth in claim 13 wherein: said first and second resistive means exhibits substantially similar characteristics of resistivity with respect to temperature.

* * * * *